United States Patent [19]

Kilinskis et al.

[11] 4,240,022
[45] Dec. 16, 1980

[54] BATTERY CHARGING CIRCUIT FOR PORTABLE POWER TOOL

[75] Inventors: David C. Kilinskis, Chicago; Louis J. Vassos, Park Ridge, both of Ill.

[73] Assignee: Skil Corporation, Chicago, Ill.

[21] Appl. No.: 891,305

[22] Filed: Mar. 29, 1978

[51] Int. Cl.³ .................................................. H02J 7/10
[52] U.S. Cl. ........................................ 320/23; 320/35; 320/59; 320/DIG. 2
[58] Field of Search .................. 320/22, 23, 35, 36, 320/39, 40, DIG. 2, 21, 59

[56] References Cited

U.S. PATENT DOCUMENTS

| | | |
|---|---|---|
| 3,465,230 | 9/1969 | Ball . |
| 3,518,524 | 6/1970 | Roszyk . |
| 3,599,072 | 8/1971 | Becker .............................. 320/39 X |
| 3,748,568 | 7/1973 | Ackermann ................... 320/DIG. 2 |
| 3,911,351 | 10/1975 | Saslow ............................. 320/35 X |
| 3,917,990 | 11/1975 | Sherman . |
| 3,919,618 | 11/1975 | Coleman et al. ........................ 320/23 |
| 3,928,792 | 12/1975 | Mullersman et al. ................... 320/35 |
| 3,935,525 | 1/1976 | Elson et al. ............................ 320/35 |

FOREIGN PATENT DOCUMENTS

| | | |
|---|---|---|
| 1285069 | 8/1972 | United Kingdom . |
| 1316169 | 5/1973 | United Kingdom . |
| 1335087 | 10/1973 | United Kingdom . |
| 1430322 | 3/1976 | United Kingdom . |

*Primary Examiner*—Robert J. Hickey
*Attorney, Agent, or Firm*—McDougall, Hersh & Scott

[57] ABSTRACT

A battery charging circuit is operable for recharging batteries in both trickle and fast charge modes. The fast charge mode is initiated and maintained by enabling a silicon controlled rectifier in circuit between a current source and the battery. A capacitor maintains the SCR in the operative state until the battery reaches full charge. A thermostatically controlled switch terminates the fast charge mode. The battery is then trickle charged for an indefinite period. Reversion to the fast charge mode is prevented by discharging the capacitor associated with the SCR when the thermostatically controlled switch opens.

11 Claims, 4 Drawing Figures

BATTERY CHARGING CIRCUIT FOR PORTABLE POWER TOOL

BACKGROUND OF THE INVENTION

This invention relates to battery charging circuits and, in particular, to circuits suitable for use with power tools which include a self-contained battery pack. In recent times there has been a trend towards making common power tools, such as electric drills, grass clippers and the like, relatively independent of a permanent source of power. This has been accomplished by providing such tools with self-contained rechargeable batteries which can provide energy to the tool for a satisfactory period of time before recharging of the batteries is required.

Typically, the batteries used for such application are of the nickel cadmium type and are suitable for recharging at a split rate. That is, the battery can be recharged at a fast rate as long as this charge rate is discontinued when the full charge condition is reached. Thereafter, only a trickle charge may be applied if damage to the battery is to be avoided. The trickle charge will maintain the battery in a full charge condition for an indefinite period of time. Failure to properly switch from fast charge to trickle charge will quickly cause damage to the battery cells requiring their replacement.

Accordingly, with the increase in popularity of the battery powered tools there has developed a need for a low cost yet highly reliable battery charging circuit which can be included with each tool for safely recharging the tool batteries.

Battery charging circuits for this purpose are known; in particular, see the patents referenced in the prior art statement which follows. Such circuits are generally more expensive to manufacture than the present invention and many of them do not have the capability of preventing reversion to the fast charge mode after the batteries have become fully charged.

It is accordingly an object of the present invention to provide a low cost battery charging circuit for rechargeable batteries of the type suitable for use in portable power tools.

It is a further object of the invention to provide a battery charging circuit capable of fast and trickle charge operating modes.

It is a further object of the invention to provide a battery charging circuit as specified in the preceding object which includes means for preventing reversion to the fast charge mode after a battery has become fully charged.

Another object of the invention is to provide a battery charging circuit capable of recharging a battery in a fast charge mode and maintaining it at full charge by applying a trickle charge thereafter.

Other objects and advantages of the invention will be apparent from the remaining portion of the specification.

PRIOR ART STATEMENT

In accordance with the provisions of 37 CFR 1.97, applicants hereby disclose the closest prior art of which they are aware: (1) U.S. Pat. No. 3,599,072 to Becker which discloses a battery charging circuit which fast charges until a battery approaches full charge. At that point a coil connected across the battery is effective for operating a reed switch to change the charge rate to a trickle charge. Periodically, however, an RC timing circuit and a unijunction transistor cause the circuit to revert back to the fast charge mode. The fast charge mode is periodically applied for correspondingly shorter periods as the battery approaches full charge. (2) U.S. Pat. No. 3,518,524 to Roszyk, which discloses a battery charging circuit employing a temperature sensitive contact for switching from the fast charge mode to the trickle charge mode when the batteries become fully charged. The charging circuit reverts to the fast charge mode each time the batteries cool sufficiently to close the temperature sensitive contact; thus, the circuit cycles between the fast charge and trickle charge modes. (3) U.S. Pat. No. 3,465,230 to Ball which discloses a battery charging circuit employing a diode connected across the batteries and which begins conducting when the batteries reach full charge. A thermal switch in contact with the diode switches the circuit from a fast charge to trickle charge mode. A resistor in parallel with the thermal switch maintains the latter open to prevent return to the fast charge rate. (4) U.S. patent application Ser. No. 746,413, filed Dec. 1, 1976, now abandoned, assigned to the present assignee. That application disclosed a battery charging circuit similar to the Ball patent whereby a thermostatic switch opens when the battery reaches full charge and is maintained open by the heat from a resistor.

DETAILED DESCRIPTION

Figure 1:
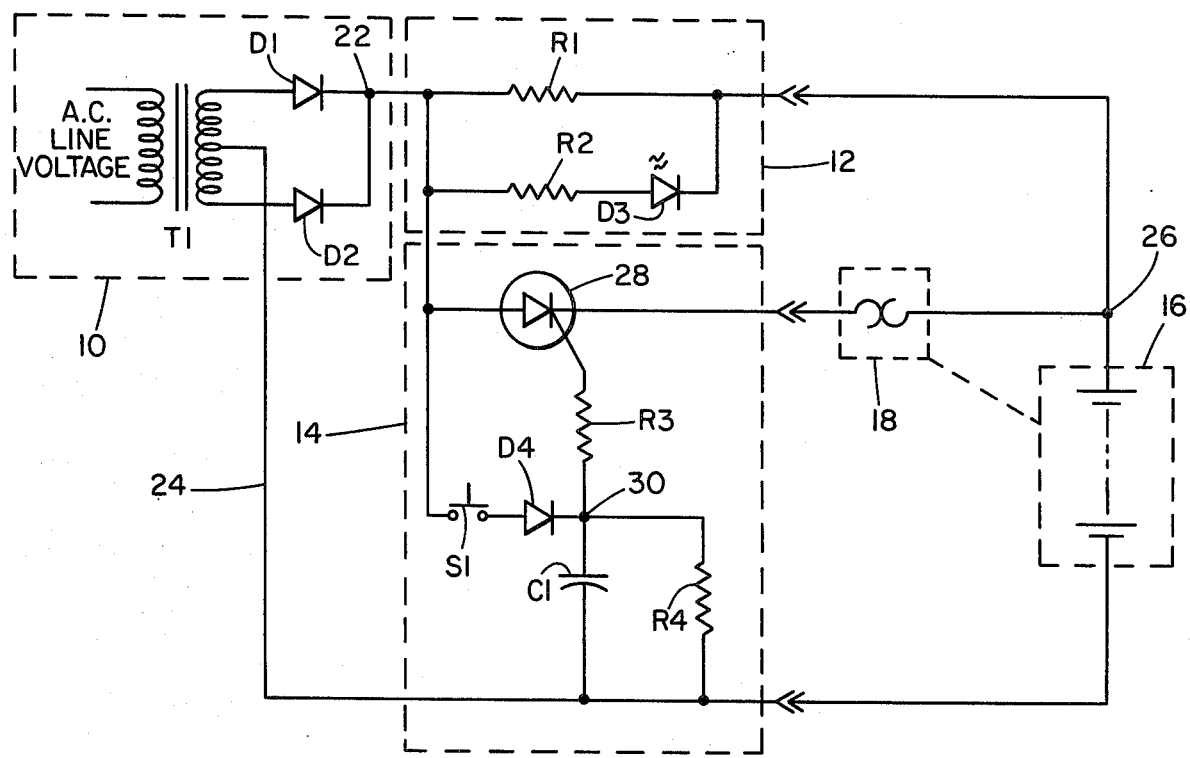
FIG. 1 is a battery charging circuit according to a first embodiment of the invention.

Referring now to FIG. 1, a first embodiment of the invention is illustrated. The circuit may be conveniently broken up into three sections for ease of discussion. These sections include a current source 10, a trickle charge section 12 and a fast charge section 14. The circuit is adapted to apply charging current to battery cells indicated schematically at 16.

These cells, preferably, are of the nickel-cadmium type which may be charged at a split rate. That is, they may be fast charged until they approach a full charge condition and then trickle charged thereafter for an indefinite period. A characteristic of such cells is that when they approach full charge there is a significant temperature rise. If fast charge is not promptly terminated after the temperature rise occurs the cells will be quickly damaged. Thus, the temperature rise in the cells is a signal which may be utilized to switch to a trickle charge current.

The circuit of FIG. 1 provides two paths or circuits from the current source 10 to the cells 16. The first path is through the trickle charge section 12. The second path is through the fast charge section 14 and a thermostat 18.

The thermostat 18, as indicated by the dashed lines, is operatively connected to detect a temperature rise in the cells 16 when they approach the full charge condition. When the cells heat up the thermostat opens thereby interrupting current flow to the cells through the fast charge section until the cells cool down. Thermostat 18 will close upon the cells cooling and, in the absence of the present invention, fast charging would resume. Such a cyclical operation of the fast charge section is undesirable as it repetitively overcharges the cells to produce a temperature rise. This is avoided by the present invention.

Figure 4:
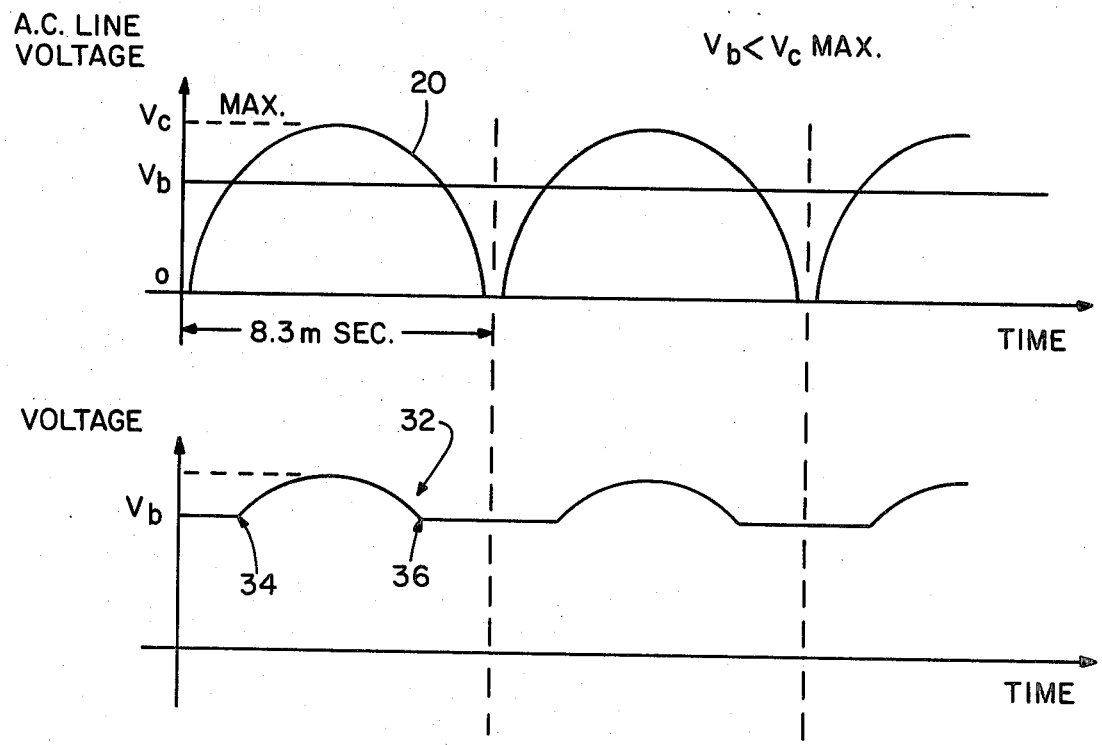
FIG. 4 is a waveform diagram useful in understanding the operation of the invention.

The current source utilized to charge the battery cells produces a full waved rectified voltage, Vc, illustrated as waveform 20 in FIG. 4. The current source includes a transformer T1 and a pair of diodes D1 and D2. AC line voltage is connected to the primary of transformer T1 while the diodes D1 and D2 are connected to the secondary to produce the full wave rectified voltage, Vc, at terminal 22. The secondary of transformer T1 is center tapped and connected to the negative terminal of the battery cells 16 via line 24. In the case of standard U.S. house current the frequency of the voltage is 60 Hz. For that case the voltage waveform has a zero value every 8.3 msecs.

The rectified voltage is applied from terminal 22 to both the trickle charge section 12 and the fast charge section 14. The trickle charge section includes a resistor R1 which limits the current to the battery cells 16 to a safe value which can be constantly applied without damage. When the fast charge section 14 is inoperative the trickle charge section 12 supplies the trickle current through the resistor R1 to positive terminal 26 of the battery. Connected in parallel with resistor R1 is a light emitting diode D3 and its associated biasing resistor R2. When illuminated, diode D3 advises the user that the cells 16 are in trickle charge and thus the battery cells are substantially fully charged and ready for use.

Referring now to the fast charge section 14, there is provided a silicon controlled rectifier 28 having the usual anode, cathode and gate electrodes. The anode of the SCR is connected to terminal 22 while the cathode is connected through the thermostat 18 to the positive terminal 26 of the cells. The gate electrode of the SCR is connected to a junction 30 via resistor R3. Connected between junction 30 and line 24 is a capacitor C1 and in parallel therewith a resistor R4. Switch S1 and diode D4 connect terminal 22 to junction 30.

As will readily be appreciated by those skilled in the art, when the SCR 28 conducts it provides a direct charging path from the current source 10 to the battery cells 16. That path is interrupted when the thermostat 18 opens as the cells approach the full charge condition. The elements connected to junction 30 serve to control the operation of the SCR until the thermostat 18 opens and to prevent operation of the SCR after the thermostat 18 opens. This aspect of the invention can be appreciated from the following description of the circuit operation.

When it is desired to initiate operation of the charging circuit the battery cells 16 are placed in the circuit and switch S1 is momentarily depressed. This applies the voltage Vc illustrated in FIG. 3 to junction 30. Capacitor C1 rapidly charges up to and is clamped at approximately the maximum value of Vc by the diode D4. The voltage Vc is also applied to the anode of the SCR while the battery voltage, Vb, is present at the cathode of the SCR. Since the battery is initially discharged, Vb will be much less than the maximum value of Vc. When the instantaneous value of Vc applied to the anode of the SCR exceeds the battery voltage Vb on the cathode, the capacitor C1 will discharge through resistor R3 producing a current flow into the SCR gate electrode. This causes the SCR to conduct providing a direct charging path to the battery cells. When the SCR goes into conduction, the voltage at the gate is clamped through the junctions of the SCR to a voltage that is slightly less than Vc. This condition allows current to flow out of the gate of the SCR through resistor R3 back to the junction 30 to recharge capacitor C1. This prepares the circuit for the next cycle of operation. The SCR ceases to conduct when the voltage Vc becomes less than Vb. Charging resumes as soon as the voltage Vc on the anode exceeds the battery voltage of the cathode since capacitor C1 has a stored charge slightly less than Vcmax, the value initially stored when switch S1 was depressed.

The fast charge cycling process repeats every 8.3 milliseconds (for 60 Hz operation) until the battery cells near full charge. As full charge is approached, the battery cells heat up and cause the thermostat 18 to open breaking the charging path through the fast charge section.

As previously indicated, the thermostat will close when the cells cool off. It is desirable, however, to prevent the resumption of the fast charging and, accordingly, means are provided to disable the SCR gate circuit during the period that the thermostat is open. Bleed resistor R4 is connected between terminal 30 and line 24 and permits C1 to discharge therethrough during the time period the thermostat is open. To prevent discharge during the fast charge cycle the value of capacitor C1 and resistor R4 are selected to produce an RC time constant which is significantly greater than the 8.3 millisecond operating cycle. As an example only, the RC time constant of capacitor C1 and resistor R4 may be on the order of 100 times greater than the period of the voltage waveform (8.3 milliseconds).

Once capacitor C1 has discharged through the resistor R4 and SCR will not conduct regardless of the state of the thermostat until switch S1 is again depressed by the user. When the fast charge section is thus disabled the trickle charge section applies a minimum current to the battery through the resistor R1 to maintain the cells in their fully charged state. The LED is also illuminated.

Figure 3:
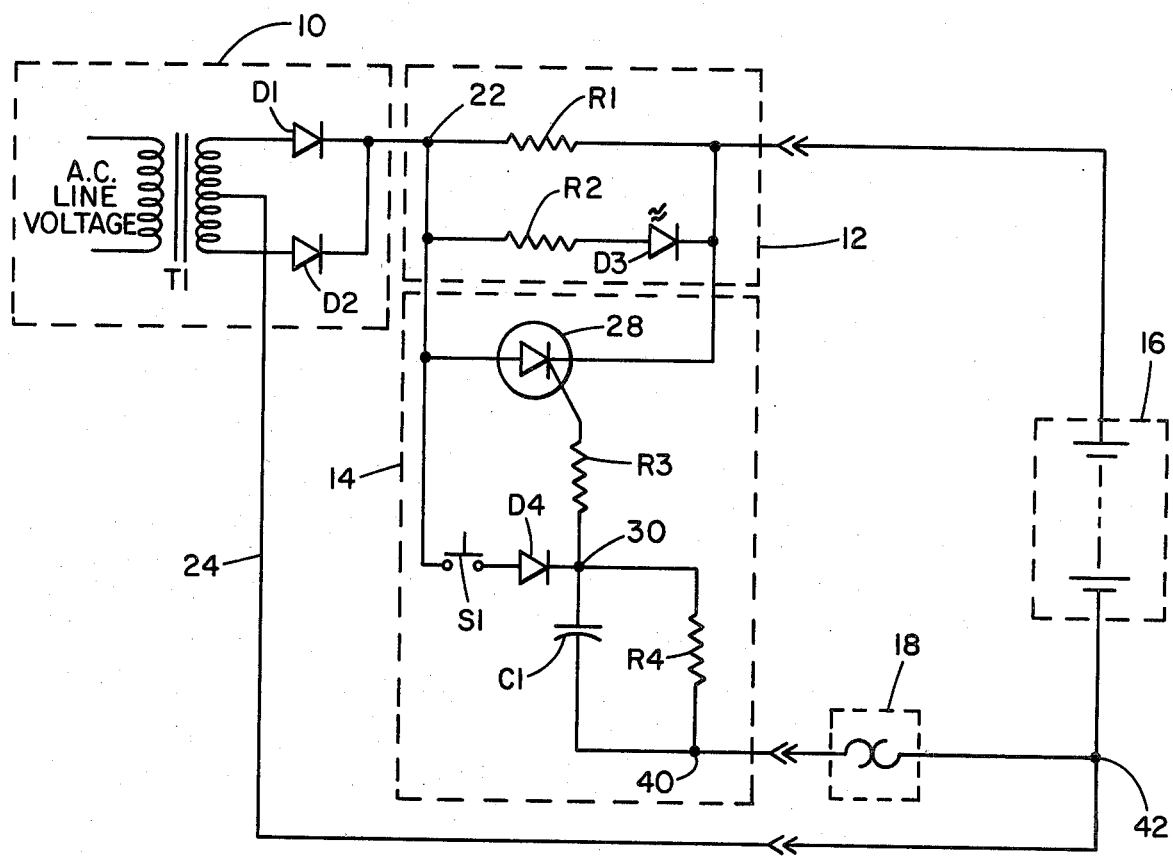
FIG. 3 is a circuit according to a third embodiment of the invention.

Waveform 32 in FIG. 3 illustrates the voltage seen at terminal 26 during fast charging of the battery. When the SCR is off the battery voltage is at value Vb. When the SCR turns on, as at point 34, the voltage at terminal 26 increases in proportion to the voltage Vc thereby charging the battery until point 36 when the SCR shuts off.

Figure 2:
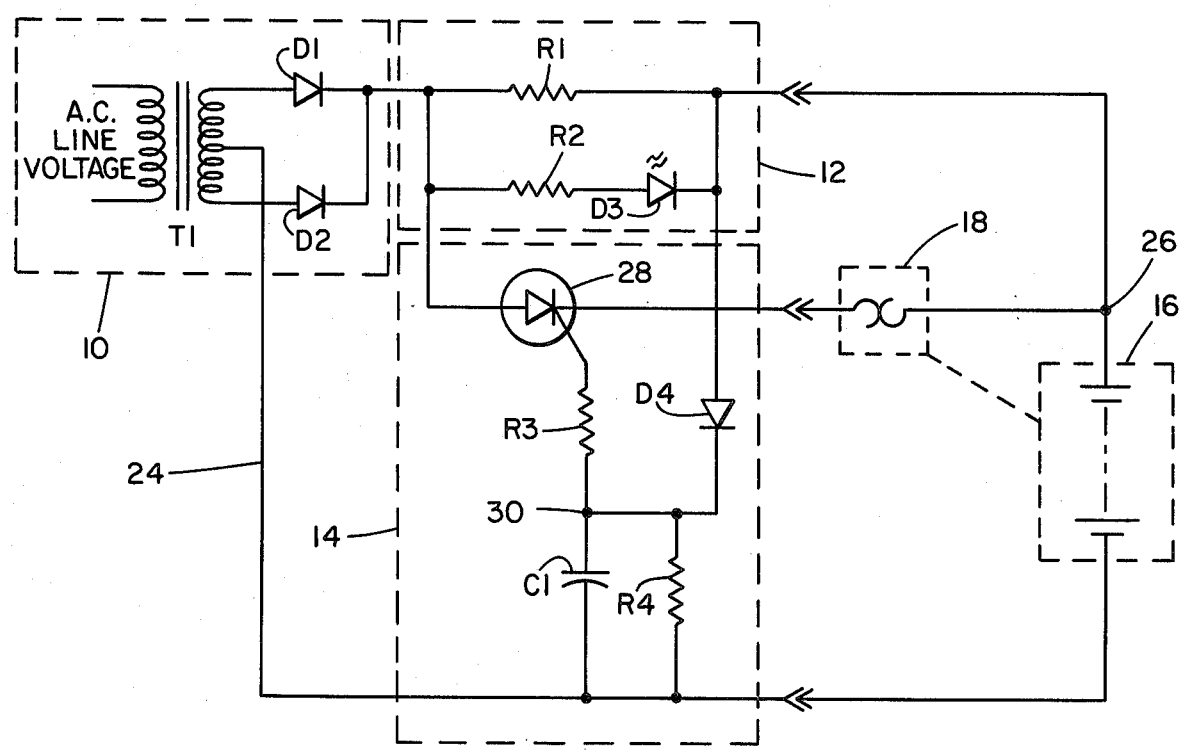
FIG. 2 is a battery charging circuit according to a second embodiment of the invention.

Referring to FIG. 2, a second embodiment of the invention is illustrated. For ease of discussion and understanding, those components which are identical with the first embodiment have been similarly identified and will not be further described except as may be necessary for an understanding of the second embodiment. As with the first embodiment the circuit includes a current source 10, a trickle charging section 12, and a fast charge section 14. The difference between the FIG. 1 and FIG. 2 embodiment resides in the fast charge section 14.

In this embodiment, junction 30 is connected to the current source through resistor R1 and diode D4. Unlike the first embodiment the second embodiment initiates fast charge as soon as the battery cells 16 are placed in the charging circuit.

Prior to placement of the cells 16 into the charging circuit, capacitor C1 is charged up through resistor R1 and diode D4 to a voltage approximating the maximum open circuit voltage Vco of the transformer T1. When the battery is placed in circuit with the charger the voltage on the anode of diode D4 drops to approximately Vb. This reverse biases diode D4 since the anode of the diode will be at a lower voltage than the cathode which is connected to capacitor C1. As a result diode D4 is effectively removed from the circuit during the fast charge cycle.

As with the first two embodiments, as the charging voltage Vc increases the anode of the SCR 28 become more positive than the cathode which is connected to the battery. Since the capacitor C1 is charged up, the SCR will turn on and initiate the charging sequence previously described in connection with FIG. 1. Charging continues until the thermostat 18 opens at which point capacitor C1 will begin discharging through resistor R4. As C1 begins to discharge diode D4 is again forward biased and thus prevents capacitor C1 from fully discharging. C1 does, however, discharge to the value of the battery voltage, Vb, less the forward voltage drop of the diode (approximately 0.7 volts). This degree of capacitor discharge is sufficient to prevent the SCR from turning on when the thermostat closes. Thus, as with the FIG. 1 embodiment, once thermostat 18 opens indicating the full charge condition, the capacitor discharges sufficiently to prevent further fast charge operation when the thermostat closes upon the battery cells cooling.

After the fast charge cycle is terminated the trickle charge section applies a trickle charge to the cells and the LED is illuminated to indicate the full charge condition.

Once the thermostat 18 has opened and capacitor C1 has partially discharged through resistor R4, fast charging cannot be reactivated until the cells 16 are removed from the circuit so that C1 can again charge to the open circuit Vco which is greater than the battery voltage Vb.

Referring now to FIG. 3, a third embodiment of the invention is illustrated. This embodiment is substantially the same as the FIG. 1 embodiment and those components which are identical with the first embodiment have been similarly identified and will not be further described except as may be necessary for an understanding of the third embodiment. As with the first embodiment, the circuit includes a current source 10, a trickle charge section 12 and a fast charge section 14.

The difference between the third embodiment and the first embodiment is that the charging current path in the third embodiment does not include the thermostat 18. Thus, the charging current path is directly from the current source through the fast charge section to the battery cell. The thermostat 18 is connected between junction 40 and the negative terminal of the battery 42 while the cathode of the SCR 28 is connected directly to the positive terminal of the battery 16.

In this embodiment when the thermostat operates it interrupts current flow to the gate circuit of the SCR rather than breaking the circuit from the current source to the positive terminal of the battery cell as in the first embodiment. The result is identical, as will be described, but the thermostat switches substantially less current than in the first embodiment. A potential problem with the first embodiment is premature opening of the thermostat due to self heating. In that embodiment the current through the thermostat is usually on the order of 2 amps. In the FIG. 3 embodiment the current through the thermostat is on the order of a few milliamps. Thus, the possibility of premature opening due to self heating is substantially eliminated. It will be obvious to those skilled in the art that a similar modification to the FIG. 2 embodiment can be made to remove the thermostat from the charging path if desired.

In operation the FIG. 3 embodiment begins the charge cycle when the switch S1 is momentarily closed charging capacitor C1 to a voltage exceeding the threshold voltage for the SCR 28. The battery cell 16 receives current through the fast charge section 14 from the current source 10. As the battery cells approach full charge the thermostat detects the heat therefrom and opens, thus disconnecting the gate portion of the fast charge circuit. The SCR will then turn off because the capacitor C1 will not be able to supply current through resistor R3 to turn the SCR back on due to the open circuit. Bleed resistor R4 will discharge the capacitor C1 while the thermostat is open to prevent reactivation of the SCR when the thermostat 18 closes.

As with the previous embodiments the values of resistor R4 and capacitor C1 are selected to produce an RC time constant which is an order of magnitude greater than the 8.3 millisecond operating cycle of the 60 hertz voltage. Once capacitor C1 has been discharged through resistor R4, the SCR will remain off and the cells 16 will be trickle charged regardless of the state of the thermostat until the switch S1 is again depressed.

The advantages of the charging circuits according to the present invention include the ability to safely and efficiently charge battery cells while utilizing a minimum number of components. In particular, with respect to the FIG. 2 embodiment, the circuit is simple and low in cost and does not require any manipulation by the user except the insertion of the battery cells into the circuit. Proper switching between the fast charge and trickle charge sections is insured by virtue of preventing the capacitor C1 from charging up sufficiently to initiate operation of the SCR until the battery cells are removed from the circuit. Similarly, the first and third embodiments are simple, low cost and provide for direct user control of the charging cycle.

While we have shown and described embodiments of this invention in some detail, it will be understood that this description and illustrations are offered merely by way of example, and that the invention is to be limited in scope only by the appended claims.

We claim:
1. A circuit for recharging battery cells comprising:
   (a) terminals for connecting the circuit to a current source,
   (b) a fast charge section in circuit between said terminals and said battery cells for charging said cells at a maximum rate, said fast charge section including:
      an SCR including a gate electrode completing a circuit path from the source to said battery cells,
      means for enabling said SCR during a portion of each half cycle of said current source including a capacitor connected to said gate electrode and initiating means for charging said capacitor to a voltage sufficient to produce a current exceeding the gate threshold of said SCR,
   (c) means for temporarily interrupting the circuit from the current source through said fast charge section when said cells approach full charge, said interrupting means including a normally closed thermostat in thermal relation with said cells, said thermostat opening due to the heat produced by said cells when they approach full charge,

(d) means for disabling said fast charge section upon operation of said interrupting means to prevent further charging at said maximum rate.

2. The circuit according to claim 1 further including a trickle charge section in circuit between said source and said battery cells for charging said cells at a minimum rate when said fast charge section is inoperative.

3. The circuit according to claim 1 wherein said current source is full wave rectified.

4. The circuit according to claim 1 wherein said disabling means includes a resistor through which said capacitor discharges during operation of said interrupting means, the RC time constant of said resistor and said capacitor being greater by at least an order of magnitude than the period of said current source.

5. The circuit according to claim 1 wherein said initiating means includes:
 (a) a diode connected to permit current flow from said current source to said capacitor for clamping said capacitor to approximately the maximum voltage produced by said current source,
 (b) a switch in circuit with said diode for selectively charging said capacitor.

6. The circuit according to claim 2 wherein said trickle charge section includes a resistor in series between said current source and said cells to reduce the current applied by said trickle section to a minimum value.

7. The circuit according to claim 6 wherein said trickle charge section further includes a light emitting diode to indicate the full charge condition of the cells.

8. A circuit for recharging battery cells comprising:
 (a) terminals for connecting the circuit to a full wave rectified current source,
 (b) a fast charge section in circuit between said terminals and said battery cells for charging said cells at a maximum rate, said fast charge section including:
  (i) an SCR including a gate electrode completing a circuit path from the current source to said cells,
  (ii) a capacitor connected to said gate,
  (iii) initiating means for charging said capacitor to a first voltage only when said cells are not electrically connected to said recharging circuit, said first voltage being sufficient to produce a current exceeding the gate threshold of said SCR,
 (c) means for temporarily interrupting the circuit from the current source through said fast charge section when said cells approach full charge, said interrupting means including a normally closed thermostat in thermal relation with said cells, said thermostat opening due to the heat produced by said cells when they approach full charge,
 (d) means for disabling said fast charge section upon operation of said interrupting means to prevent further charging at said maximum rate.

9. The circuit according to claim 8 further including a trickle charge section for charging said cells at a minimum rate when said fast charge section is inoperative, said trickle charge section including a resistor in series between said current source and the positive terminal of said cells.

10. The circuit according to claim 9 wherein said initiating means includes a diode connected between the battery cell side of said resistor and said capacitor to permit current flow from said source through said resistor to said capacitor when said cells are removed from said recharging circuit thereby to charge said capacitor to said first voltage, said diode being reverse biased upon placing said cells into said recharging circuit due to the voltage drop at the cell side of said resistor thereby to clamp said capacitor at said first voltage.

11. The circuit according to claim 8 wherein said disabling means includes a resistor through which said capacitor discharges during operation of said interrupting means, the RC time constant of said resistor and said capacitor being greater by at least an order of magnitude than the period of said current source.

* * * * *